United States Patent [19]

Meyer

[11] 3,764,877

[45] Oct. 9, 1973

[54] STRUCTURE FOR AND METHOD OF PATTERN TRACING CONTROL

[75] Inventor: Walter E. Meyer, Ferndale, Mich.

[73] Assignee: Koehring Company, Milwaukee, Wis.

[22] Filed: Dec. 23, 1971

[21] Appl. No.: 211,185

[52] U.S. Cl. .............................. 318/578, 318/571
[51] Int. Cl. ........................................... G05b 19/36
[58] Field of Search ........................... 318/571, 578

[56] References Cited
UNITED STATES PATENTS

| | | | |
|---|---|---|---|
| 2,843,810 | 7/1958 | Carr, Jr. | 318/578 X |
| 3,430,035 | 2/1969 | Read | 318/571 X |
| 2,627,055 | 1/1953 | Calosi | 318/578 |
| 2,753,468 | 7/1956 | Carr, Jr. | 318/578 X |
| 2,927,735 | 3/1960 | Scuitto | 318/571 X |
| 3,559,021 | 1/1971 | Bingham, Jr. | 318/578 X |

*Primary Examiner*—T. E. Lynch
*Attorney*—Dale R. Small

[57] ABSTRACT

Structure for and method of sensing deflection of a pattern tracing probe in three mutually perpendicular directions, providing direction of feed signals for driving a tracing cutter over a workpiece connected to the probe in two of the three mutually perpendicular directions in accordance with the probe deflections sensed in the two directions, providing magnitude of error signals for driving the cutter over the workpiece in the two directions in accordance with a comparison between a signal representative of the three-dimensional resultant vector of the probe deflection sensed with a reference signal selected in accordance with an allowable tracing tolerance, driving the cutter in the two directions in accordance with the combined feed and error signals in each direction as the pattern is traversed from side to side and indexing the tracing probe and cutter in the third mutually perpendicular direction after each traverse of the pattern by the probe to reproduce the pattern in the workpiece.

15 Claims, 6 Drawing Figures

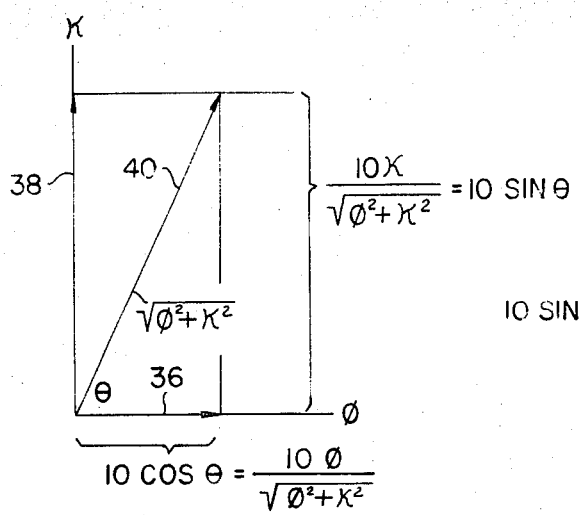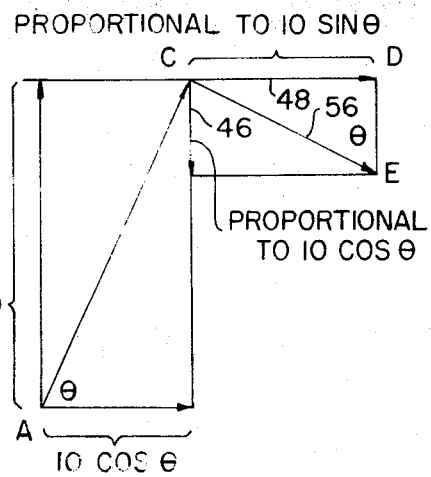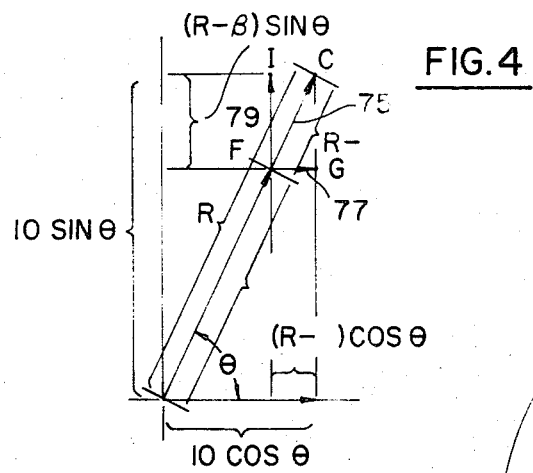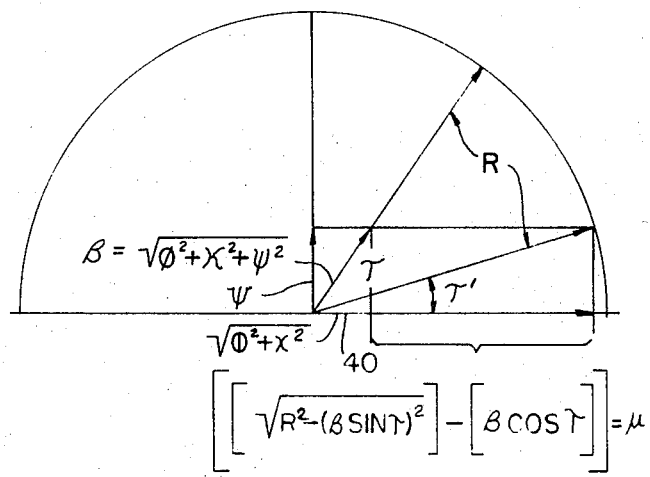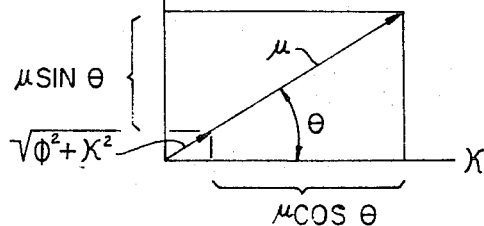
INVENTOR
WALTER E. MEYER 3,764,877

STRUCTURE FOR AND METHOD OF PATTERN TRACING CONTROL

BACKGROUND OF THE INVENTION

1. Field of the Invention

The invention relates to the control of a tracing cutter in response to deflection of a tracing probe for reproducing a model traced by the tracing probe and refers more specifically to a system for reproducing a three-dimensional model wherein two mutually perpendicular dimensions of the model are traversed in one direction with a tracing probe, the probe is then incrementally moved in the direction of the extent of the third mutually perpendicular dimension of the model and the model is then traversed in a direction opposite to the one direction. This procedure is repeated until the model has been completely traversed in its third dimension. The invention specifically includes servo amplifier circuits by which a tracing cutter is moved in accordance with the sensed deflections of a tracing probe in three mutually perpendicular directions and the method by which the movement of the tracing cutter is accomplished in response to the deflection of the tracing probe.

2. Description of the Prior Art

In the past, reproduction of three-dimensional models as, for example, in metal by cutting tools to produce dies and the like, has sometimes been accomplished by machining of individual contours of a model without benefit of tracing controls. Wherein tracing controls have been used to copy the model exactly by means of a probe, tracing the model and sensing the contours thereof and a tracing cutter movable in accordance with the deflection of the probe, which cutter is controlled by an electronic circuit as, for example, in the known Herndon U.S. Pat. No. 2,983,858, the control circuits have been relatively complicated and therefore expensive.

SUMMARY OF THE INVENTION

In accordance with the invention, the movement of a tracing probe on a three-dimensional model surface is sensed with the tracing probe moving over the model in one direction to produce direction of feed and magnitude of error drive signals for the drive mechanisms of a tracing cutter in two mutually perpendicular directions corresponding to the two dimensions of the model in the direction of movement of the probe over the model in accordance with the deflection of the tracing probe in three mutually perpendicular directions corresponding to the three mutually perpendicular dimensions of the model.

Specifically, in accordance with the invention the deflection of a tracing probe tracing a three-dimensional model in three mutually perpendicular directions is sensed while the probe is moved from side to side of the three-dimensional model in a two-dimensional plane. A directional feed signal for a tracing cutter associated with the probe is provided in each of two mutually perpendicular directions in the two-dimensional plane in accordance with the deflection of the probe in the corresponding two directions. To establish the magnitude of feed of the tracing cutter, the total deflection of the tracing probe in three dimensions is then compared with a reference signal representative of a selected tolerance for a model being produced and the resulting signal is multiplied by the feed signals to provide error signals which are then combined with the corresponding feed signals to provide drive signals for the tracing cutter in each of the two mutually perpendicular directions.

Each time the tracing cutter traverses the model from side to side in the two-dimensional plane, it is indexed a preset amount in a direction perpendicular to the two-dimensional plane corresponding to the third mutually perpendicular dimension of the model being traced and tracing in an adjacent two-dimensional plane is repeated unitl the third dimension of the model being traced is completely traversed.

BRIEF DESCRIPTION OF THE DRAWINGS

FIGS. 2 through 6 are diagrams useful in explaining the method of pattern tracing accomplished on operation of the circuit of FIG. 1.

DESCRIPTION OF THE PREFERRED EMBODIMENT

Figure 1:
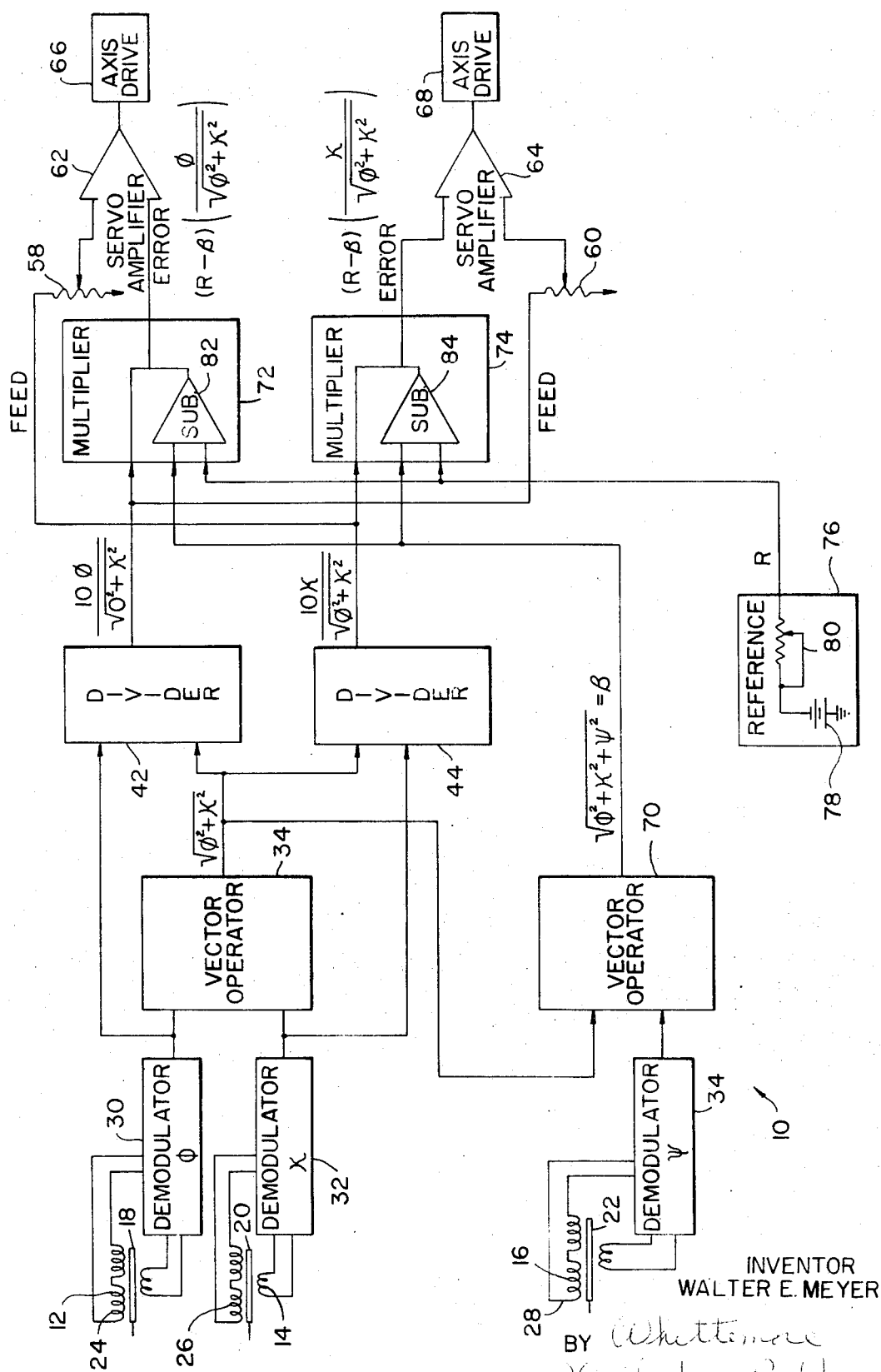
FIG. 1 is a partly schematic, partly block diagram of a pattern tracing control circuit constructed in accordance with the invention.

The pattern tracing control structure 10 shown best in FIG. 1 includes separate linear variable differential transformers 12, 14 and 16 for providing electric signals representing the deflection of a tracing probe (not shown) in three directions along phi, kappa and psi mutually perpendicular axes, which deflections are produced by movement of the tracing probe over a model to be traced. Tracing probes usually move with an associated tracing cutter, and in the control structure under consideration the tracing probe is considered to be suspended with equal spring rates in each of three mutually perpendicular directions with the cores 18, 20 and 22 of the linear variable differential transformers secured thereto for movement therewith in the mutually perpendicular directions whereby on movement of the probe the required signals proportional to the movement of the probe in the mutually perpendicular directions are produced in the coils 24, 26 and 28 of the linear variable differential transformers which are not movable with the probe except as the probe is moved with the cutter.

In the tracing control structure 10 illustrated in FIG. 1, the electrical signals representing movement of the probe in two mutually perpendicular directions, for example the phi and kappa directions, are resolved into vector component direct current signals proportional to deflection of the probe in the phi and kappa directions corresponding to two mutually perpendicular dimensions of a three-dimensional model as the probe moves over a traced model from one side to the other side thereof in the demodulators 30 and 32. Thus, the signal out of the demodulators 30 and 32 are direct current signals proportional to the deflection of the tracing probe in two mutually perpendicular directions in the plane in which the probe is advanced from side to side of the three-dimensional model. The signals out of demodulators 30 and 32 ultimately provide directional or feed signals for driving the tracing cutter and probe in the two mutually perpendicular directions as will be seen subsequently.

A vector component direct current signal proportional to the movement of the probe in a third direction perpendicular to the plane of the perpendicular directions phi and kappa is produced in the demodulator 34.

The third mutually perpendicular direction is designated psi. The purpose of the third electric signal proportional to the deflection of the probe in the psi direction is to ultimately provide a magnitude or error signal in conjunction with the signals from the demodulators 30 and 32 for driving the tracing probe and cutter in the two directions in accordance with the three-dimensional deflection of the tracing probe, as will also be seen subsequently.

The vector component signal from each of the demodulators 30 and 32 representing the deflection of the tracing probe in two dimensions in the plane of movement of the probe and cutter of the tracing system are passed into a vector operator circuit 34 which produces as an output an electric signal which is the vector of which the vector component signals from the demodulators 30 and 32 are components of. That is to say, the vector operator 34 produces a signal which is the square root of the sum of the square of the phi signal plus the square of the kappa signal.

The relationship between the signals out of the demodulators 30 and 32 and the vector operator 34 is illustrated in FIG. 2. Thus, the signal out of the demodulator 30 will be, for example, the vector component 36, while the signal out of the demodulator 32 will be the vector component 38. The signal out of the vector operator 34 will then be the position vector signal 40 shown in FIG. 2.

The vector component signal from the demodulator 30 is also passed directly from the demodulator 30 to the divider 42, while the vector component signal from the demodulator 32 is passed directly to the divider 44. The position vector signal from the vector operator 34, as shown in FIG. 1, is passed to both the dividers 42 and 44. Dividers 42 and 44 are similar and provide an output signal which is the signal from the demodulators 30 and 32 divided by the signal from the vector operator 34, respectively.

In addition, the dividers 42 and 44 provide a factor of 10 amplification. Thus, the output from divider 42 is 10 times the phi signal over the square root of the sum of the phi signal squared plus the kappa signal squared, the the output of the divider 44 is 10 times the kappa signal over the square root of the phi signal squared plus the kappa signal squared.

As shown in FIG. 2, such signals are 10 times the cosine of the angle theta between the vector component signal 36 and position vector signal 40 and 10 times the sine of the angle theta. Further, it will be understood that the position vector signal 40 is perpendicular to the two-dimensional line traced by the tracing probe on the surface of the three-dimensional model on movement of the probe from side to side of the model due to the particular suspension of the probe.

Since the positional vector 40 is perpendicular to the two-dimensional line on the surface being traced, by taking the proper proportion of the 10 cosine theta vector component 36 and the 10 sine theta vector component 38, a resultant direction or feed vector 56 is provided having feed vector components 46 and 48 as shown in FIG. 3, which feed vector is parallel to the surface traced and will insure that the cutter is always fed into the work as desired.

The 10 cosine theta vector 36 and the 10 sine theta vector 38 are proportioned by the potentiometers 58 and 60, as shown in FIG. 1. The potentiometers 58 and 60 are ganged for movement together to proportion the feed vector components 46 and 48 to provide the parallel feed vector 56 for the tracing cutter resulting from the similarity of the triangles CAB and CED, as shown in FIG. 3.

The feed signals represented by the vector components 46 and 48 are fed into the servo amplifiers 62 and 64 which ultimately provide drive signals for the mutually perpendicular axis drives 66 and 68 of the tracing cutter in the two directions of movement of the tracing probe, in accordance with the feed signals and the error signals which are developed as follows.

The direct current vector component signal from the demodulator 34 representing deflection of the tracing probe in the third mutually perpendicular direction psi is fed into the vector operator 70 along with the vector signal output from the vector operator 34 so that the resultant total vector output of the vector operator 70 is the square root of the sum of the phi signal squared, the kappa signal square and the psi signal squared, which is indicated as beta in FIG. 1. This total vector signal is then the resultant signal of the total deflection of the tracing probe in three mutually perpendicular directions as a result of tracing the three-dimensional model in two dimensions which resultant signal is fed to the multipliers 72 and 74 along with the vector component signals 36 and 38.

A reference signal is also provided the multipliers 72 and 74 from the reference signal generator 76 which includes a source of direct current electrical energy 78 and a reference signal selecting potentiometer 80, as shown. The reference signal from the reference signal generator 76 is first subtracted from the total vector signal beta in the multipliers 72 and 74 as, for example, by subtracting circuits 82 and 84 integral therewith. The difference signals; that is, the difference between the reference signal and the beta signal is then multiplied by the 10 cosine theta or 10 sine theta signals from the dividers 42 and 44 to provide an error signal output from the multipliers 72 and 74. The multipliers 72 and 74 include a one-tenth multiplication factor which cancels the 10 multiplication factor of the dividers 42 and 44.

The error signal output of the multipliers 72 and 74 determine the quantity of movement of the tracing cutter, while the feed signals from the dividers 42 and 44 proportioned through the potentiometers 58 and 60 determine the direction of movement of the tracing cutter. Together the output signals from the servo amplifiers 62 and 64 produce ultimate driving of the perpendicular axis drives 66 and 68 connected to the cutter, which is not shown.

As shown in FIG. 4, the error signals from multipliers 72 and 74 are the vector components of the difference signal 75 shown as FC in FIG. 4 between the reference signal R shown as AC from the reference signal generator 76 and the total probe deflection vector signal $\beta$ shown as AF from vector operator 70. Thus, the error signal 77 from the multiplier 72 is $(R-\beta)(\cos\theta)$ and is shown as FG, while the error signal 79 from the multiplier 74 is $(R-\beta)(\sin\theta)$ and is shown as FI.

The error signals always tend to drive the cutter and therefore the probe connected thereto so as to produce a total vector signal $\beta$ which is of the same value as the reference signal R. When the total vector signal $\beta$ equals the reference signal R, there will be no drive to the axes drive mechanisms 66 and 68.

While corrections are made in two relatively perpendicular directions, that is the phi and kappa directions, with the drive axes 66 and 68, it will be seen from FIGS. 5 and 6 that the error signal in the indicated two directions will be related to the error signal in the third mutually perpendicular direction with the three directions corresponding to the three dimensions of a model being traced. Thus, if there is deflection in the third direction, movement in the other two directions will be initiated to correct the vector $\beta$ to the reference voltage R.

As shown in FIG. 5 a correction in the phi, kappa plane which is perpendicular to the plane of the drawing tending to increase the vector 40 toward the total probe displacement vector $\beta$ will produce a change in the tau angle from the vector 40 to the total probe displacement vector $\beta$ to tau'. The error vector $\mu$ is slightly smaller than the theoretical vector; however, the angle $\theta$ is correct. Also, when $\beta$ equals R the difference between theoretical and actual error signals is zero as can be seen from equations 3 and 4. As shown in FIG. 6, mu sine theta and mu cosine theta will become zero as mu becomes zero and mu will become zero as the phi and kappa corrections become zero.

While movements of the tracing cutter and probe are made in two relatively perpendicular directions with the drive axes 66 and 58 and the tracing cutter and probe are to be indexed in a third mutually perpendicular direction in accordance with the invention, it will be seen from FIGS. 5 and 6 that the error signals and therefore the signals provided the drive axes 66 and 68 reflect the deflection of the tracing probe in the third mutually perpendicular direction psi as the probe traces a pattern.

In FIG. 5 the phi, kappa plane is assumed to be extending perpendicularly to the drawing so that the psi dimension is in the plane of the drawing along with the vector 40 representing the total deflection of the probe in the phi, kappa plane. Therefore, the vector B showing total deflection of the probe in three dimensions is also illustrated in the plane of the drawing of FIG. 5 along with the reference signal from the reference signal generator 76. The apparent error signal mu in the phi, kappa plane is then given by the formula shown in FIG. 5 wherein tau is the angle between the total probe deflection B and the phi, kappa plane.

With the formula for mu shown in FIG. 5, it will be evident that as the error mu is reduced in the phi, kappa plane as indicated above by axis drives 66 and 68, the angle tau will be reduced as for example to tau'. As a consequence, as the actual error signal mu approaches the theoretical error signal which is the difference between the reference signal and the signal beta, the actual error signal mu will become the theoretical three-dimensional error signal desired when and only when the corrections in the phi, kappa plane have been made completely so that beta equals the reference signal.

The directional signals are always exact for the two active dimensions phi and kappa since the angle theta is exact.

Mathematically the above statements can be shown to be true with reference to FIG. 6 which is in the phi, kappa plane. With the geometry of FIG. 6, it can be seen that the error along the kappa axis is equal to mu cosine theta and is given by Equation 1 below, while the error along the phi axis is equal to mu sine theta and is given by Equation 2 below. Further, the difference between the theoretical and actual error signal on the kappa axis and phi axes is given by Equations 4 and 3, respectively. It can be seen from Equations 3 and 4 that as the sine and cosine of the angle theta approach zero, the difference between the theoretical and actual error on both the phi and kappa axes approaches zero.

Equation 1:

$$z\ \text{error} = \left\{ \left( \sqrt{(\text{ref})^2 - [(\sqrt{x^2+z^2+y^2})(\sin \tau)]^2} \right) - [(\sqrt{x^2+z^2+y^2}) \cos \tau] \right\} \cos \theta$$

Equation 2:

$$x\ \text{error} = \left\{ \left( \sqrt{(\text{ref})^2 - [(\sqrt{x^2+z^2+y^2})(\sin \tau)]^2} \right) - [(\sqrt{x^2+z^2+y^2} \cos[ \right\} \sin \theta$$

Equation 3:

$$\{[[\sqrt{R^2 - (\beta \sin \tau)^2}] - \beta \cos \tau] \sin \theta\} - \{(R-\beta) \sin \theta\} = \text{Difference between theoretical and actual error in } \Phi \text{ axis}$$

Equation 4:

$$\{[[\sqrt{R^2 - (\beta \sin \tau)^2}] - \beta \cos \tau] \cos \theta\} - \{(R-\beta) \cos \theta\} = \text{Difference between theoretical and actual error in K axis}$$

In overall operation of the tracing structure illustrated in FIG. 1, in accordance with the method of the invention a tracing probe connected to a tracing cutter for movement therewith and spring suspended for movement in three mutually perpendicular directions with the same spring rate relative to the tracing cutter is moved in a straight line from one side to the other of a three-dimensional model in contact with the model to produce direct current electrical signals from the demodulators 30 and 32 in accordance with the deflection of the tracing probe relative to the model perpendicular to the surface traced through the linear variable differential transformers 12, 14 and 16, connected to sense the displacement of the tracing probe in the three mutually perpendicular directions phi, kappa and psi.

The phi and kappa signals are fed into a vector operator 34 to produce an output signal which is the square root of the sum of the squares of the phi and kappa signals. The phi and kappa signals are divided by the sum of the square root of the sum of the squares of the phi and kappa signals in the dividers 42 and 44. The dividers have a 10 times multiplier factor to produce feed signals which when properly proportioned cause the tracing cutter to feed along perpendicular axis drives in the plane of movement of the tracing probe and cutter in a direction parallel to the surface of the traced model and perpendicular to the deflection of the tracing probe. The feed signals establish the direction of movement of the tracing cutter for producing a three-dimensional replica of a three-dimensional model traced on repeated traversing of the model from side to side with indexing of the probe and cutter in the third direction on reaching either side of the model being traced.

Corresponding error signals to determine the magnitude of feed of the cutter in the two mutually perpendicular directions are produced by combining the psi signal with the phi and kappa signals to produce a signal representative of the total deflection of the probe perpendicular to the three-dimensional surface being traced to provide a beta signal which is then compared with a reference signal selected in accordance with a predetermined machining tolerance to provide a difference signal, which difference signal is then multiplied by the feed signals prior to proportioning thereof.

The feed signals and error signals are then fed into separate servo amplifiers which produce a single output signal for driving the two axis drives of the tracing control structure in two mutually perpendicular directions to move the tracing cutter over a workpiece as the tracing probe is traversed from side to side of a model or pattern in a manner to reproduce the surface being traced by the probe on indexing of the cutter and probe in the third mutually perpendicular direction at either side of the workpiece each time the surface being traced has been traversed from side to side thereof.

It will be understood that while a three-dimensional tracing system has been considered above that if the model is a two-dimensional model, the psi signal will not be present in the overall probe position vector out of the vector operator 70 so that the psi term will be missing from $\beta$. The operation of the tracing system will not be affected by a zero psi signal. Thus, the structure illustrated in FIG. 1 operating as disclosed above will function with two-or three-dimensional models without modification.

While one embodiment of the present invention has been considered in detail, it will be understood that other embodiments and modifications of the invention are contemplated. It is the intention to include all modifications and embodiments of the invention as are defined by the appended claims within the scope of the invention.

What I claim as my invention is:

1. A control circuit for tracing apparatus comprising means for developing a pair of direct current electrical feed signals proportional to deflection of a tracing probe along two mutually perpendicular axes, means connected to the means for developing a pair of feed signals for developing an electrical signal proportional to the total deflection of the tracing probe in three mutually perpendicular directions, means for developing a reference signal, means connected to all of the aforesaid means for combining the feed signals, the total probe deflection signal and reference signal to provide a pair of error signals, and means for driving a tracing cutter in the two mutually perpendicular directions in accordance with the feed and error signals.

2. Structure as set forth in claim 1 wherein the means for developing the feed signals each includes a separate electrical sensor for providing a signal proportional to the deflection in one of the two perpendicular directions, a vector operator receiving the two signals representative of the deflection of the probe in the two perpendicular directions and providing an output signal which is the square root of the sum of the squares of the signals proportional to the deflection in the two directions and separate dividers for dividing each of the signals proportional to the deflection in the two directions by the signal which is the square root of the sum of the squares of these signals.

3. Structure as set forth in claim 2 wherein the dividing means contains means for multiplying the output signal.

4. Structure as set forth in claim 2 and further including means operably connected to the dividing means for taking a proportion of each of the divided signals to provide a resultant vector signal which is perpendicular to the direction of deflection of the tracing probe.

5. Structure as set forth in claim 1 wherein the means for developing a signal proportional to the total deflection of the tracing probe comprises a vector operator receiving a signal which is the square root of the sum of the squares of the perpendicular signals in the two directions and a signal which is proportional to the deflection of the probe in a third mutually perpendicular direction and for providing an output signal which is equal to the square root of the sum of the squares of the signals in the three mutually perpendicular directions.

6. Structure as set forth in claim 1 wherein the means for providing a reference signal is manually adjustable and provides a signal representative of a reference tracing probe deflection.

7. Structure as set forth in claim 1 wherein the means for providing the error signals includes means for first subtracting the signal proportional to the probe deflection in three mutually perpendicular directions from the reference signal and means for subsequently multiplying the subtracted signal and the feed signals.

8. A control circuit for tracing apparatus comprising means for sensing deflection of a tracing probe in three mutually perpendicular directions and for developing signals proportional to the sensed deflections, means operable connected to the means for sensing the deflection of the probe in two of the three mutually perpendicular directions for providing a pair of feed signals representing the direction the probe should be driven in the two mutually perpendicular directions to maintain a predetermined probe deflection error, means connected to the means for providing the feed signals and to the means for developing the signals proportional to the sensed deflections for developing a signal proportional to the total deflection of the probe in the three mutually perpendicular directions, means for developing a reference signal, means connected to the means for developing a signal proportional to the total deflection of the probe in the three mutually perpendicular directions, to the means for providing feed signals and to the means for developing a reference signal for providing error signals representative of the magnitude of the total probe deflection error in three mutually perpendicular directions, means for combining the feed and error signals to provide axis drive signals in the two mutually perpendicular directions, and means for driving a cutter associated with the tracing probe in the two mutually perpendicular directions in accordance with the axis drive signals.

9. Structure as set forth in claim 8, wherein the means for providing a pair of feed signals comprises a pair of demodulators for receiving the signals proportional to the deflection of the probe in the two mutually perpendicular directions and providing direct current output signals proportional thereto, a vector operator connected to the demodulators for providing an output signal which is the vector sum of the signals from the demodulators, a pair of dividers one for dividing the signal from each demodulator by the output signal of the vector operator and a pair of potentiometers connected to receive the output of the pair of dividers proportioned to provide output signals therefrom having a resulting vector perpendicular to the output signal from the vector operator.

10. Structure as set forth in claim 9 wherein the means for providing the error signals comprises means for subtracting the signal from the means for developing a signal proportional to the total deflection of the probe in the three mutually perpendicular directions from the reference signal, and means for multiplying the resulting subtracted signal by the output of each of the dividers.

11. Structure as set forth in claim 10 wherein the means for providing axis drive signals comprises a separate servo amplifier operable to receive the error and feed signals corresponding to each of the two mutually perpendicular directions and to provide output signals which correspond thereto in magnitude and direction.

12. A method of controlling tracing apparatus comprising sensing deflection of a tracing probe in three mutually perpendicular directions and developing signals proportional to the sensed deflections, providing a pair of feed signals in response to the developed signals proportional to deflection of the probe in two of the three mutually perpendicular directions representing the direction the probe should be driven in the two mutually perpendicular directions to maintain a predetermined probe deflection error, developing a signal proportional to the total deflection of the probe in the three mutually perpendicular directions, developing a reference signal, combining the signal proportional to the total deflection of the probe in the three perpendicular directions, the reference signal and the feed signals to provide error signals representative of the magnitude of the total probe deflection error in the three mutually perpendicular directions, and combining the error and feed signals to provide axis drive signals in the two mutually perpendicular directions, and driving a cutter associated with the tracing probe in the two mutually perpendicular directions in accordance with the axis drive signals.

13. The method set forth in claim 8, wherein providing a pair of feed signals includes receiving the signals proportional to the deflection in the two mutually perpendicular directions and providing direct current output signals proportional thereto, providing a vector sum signal of the signals in the two mutually perpendicular directions, dividing each of the signals proportional to the deflection in the two mutually perpendicular directions by the vector sum signal to provide a quotient signal and providing output feed signals therefrom having a vector sum signal perpendicular to the vector sum of the signals in the two mutually perpendicular directions.

14. The method set forth in claim 13 wherein providing the error signals includes subtracting the signal proportional to the total deflection of the probe in the three perpendicular directions from the reference signal and multiplying the resulting subtracted signal by the quotient signals.

15. The method set forth in claim 14 wherein providing an axis drive signal includes passing the feed and error signals corresponding to the two mutually perpendicular directions through separate servo amplifiers to provide output signals which are proportional to the feed and error signals in direction and magnitude.

* * * * *